United States Patent [19]

Peuckert et al.

[11] Patent Number: 5,176,941
[45] Date of Patent: Jan. 5, 1993

[54] PROCESS OF PRODUCING A CERAMIC/FIBER COMPOSITE USING A MOLTEN POLYSILAZONE

[75] Inventors: Marcellus Peuckert; Martin Brück, both of Hofheim am Taunus; Thomas Gerdau, Eppstein/Taunus; Tilo Vaahs, Kelkheim; Hans-Jerg Kleiner, Kronberg/Taunus; Fritz Aldinger, Rodenbach, all of Fed. Rep. of Germany

[73] Assignee: Hoechst Aktinegesellschaft, Frankfurt am Main, Fed. Rep. of Germany

[21] Appl. No.: 444,032

[22] Filed: Nov. 30, 1989

Related U.S. Application Data

[60] Continuation-in-part of Ser. No. 502,321, Mar. 30, 1990, Pat. No. 5,084,423, which is a division of Ser. No. 266,513, Nov. 3, 1988, Pat. No. 4,935,481, and a continuation-in-part of Ser. No. 491,534, Mar. 12, 1990, Pat. No. 5,066,623, which is a division of Ser. No. 247,933, Sep. 22, 1988, Pat. No. 4,931,513.

[30] Foreign Application Priority Data

Dec. 3, 1988 [DE] Fed. Rep. of Germany ....... 3840781

[51] Int. Cl.⁵ .............................................. B05D 3/02
[52] U.S. Cl. ................................. 427/226; 427/228; 427/340; 427/341; 427/375; 427/387; 427/393.6; 528/28; 528/38

[58] Field of Search ............ 427/226, 228, 387, 393.6, 427/340, 341, 375; 428/391, 447; 528/22, 31, 28, 38; 525/474; 501/97, 96

[56] References Cited

U.S. PATENT DOCUMENTS

| | | | |
|---|---|---|---|
| 3,853,567 | 12/1974 | Verbeck | 106/44 |
| 4,312,970 | 1/1982 | Gaul, Jr. | 526/279 |
| 4,460,640 | 7/1984 | Chi et al. | 428/224 |
| 4,482,669 | 11/1984 | Seyferth et al. | 524/442 |
| 4,618,591 | 10/1986 | Okamura et al. | 501/90 |
| 4,689,252 | 8/1987 | Lebrum et al. | 427/228 |
| 4,772,494 | 9/1988 | Porte et al. | 427/374.7 |
| 4,847,345 | 7/1989 | Takamizawa et al. | 528/35 |
| 4,873,039 | 10/1989 | Serita et al. | 264/65 |
| 4,931,513 | 6/1990 | Gerdau et al. | 525/474 |
| 4,935,481 | 6/1990 | Vaahs et al. | 528/28 |
| 5,008,423 | 4/1991 | Gerdau et al. | 556/412 |

FOREIGN PATENT DOCUMENTS 63-243328 10/1988 Japan.
1-153730 6/1989 Japan.

*Primary Examiner*—Shrive Beck
*Assistant Examiner*—Roy V. King
*Attorney, Agent, or Firm*—Connolly and Hutz

[57] ABSTRACT

The invention relates to a process for the production of a ceramic/fiber composite.

The process comprises impregnating fibers with a molten polysilazane in a first step, converting the polysilazane in the fibers into the infusible state in a second step and, in a third step, heating the impregnated fibers to 800° to 2000° C. in an atmosphere of nitrogen, noble gas, or ammonia.

9 Claims, No Drawings

PROCESS OF PRODUCING A CERAMIC/FIBER COMPOSITE USING A MOLTEN POLYSILAZONE

This application is a continuation-in-part of Ser. No. 502,321 filed Mar. 30, 1990, U.S. Pat. No. 5,084,423, which is a division of Ser. No. 266,513 filed Nov. 3, 1988, U.S. Pat. No. 4,935,481 and is also a continuation-in-part of Ser. No. 491,534 filed Mar. 12, 1990, U.S. Pat. No. 5,066,623 which is a division of Ser. No. 247,933 filed Sept. 22, 1988, U.S. Pat. No. 4,931,513.

BACKGROUND OF THE INVENTION

1. Field of the Invention

The present invention relates to a ceramic/fiber composite and a process for its production.

Because of its high breaking strength, dimensional stability, resistance to high temperature and to corrosion, ceramic/fiber composite is gaining a continuously growing importance. The good properties of the ceramic/fiber composite are based on the combination of a matrix and built-in fibers.

2. Description of the Related Art

A ceramic/fiber composite in which the fibers are fist impregnated with polysilazane and the polysilazane is then thermally decomposed to silicon nitride is described in EP-0,125,772 A1. A disadvantage with this process is that, for the impregnation of the fibers, the polysilazane must be dissolved in solvent.

After the impregnation, the solvent must be removed. Cavities form as a result of the removal of the solvent from the fiber composite, resulting in a ceramic fiber composite possessing properties which are not always satisfactory. It has been found that ceramic fiber composites have an increasing breaking strength and dimensional stability if there are only a few cavities in the ceramic fiber composite.

SUMMARY OF THE INVENTION

The object was, therefore, to provide a process for the production of ceramic/fiber composites, with which a ceramic/fiber composite having an increased breaking strength and dimensional stability is obtained, which in the crude state is dimensionally stable and easily workable and which remains dimensionally stable during heating.

DESCRIPTION OF THE PREFERRED EMBODIMENTS

One subject of the present invention is a process for the production of a ceramic/fiber composite, which comprises impregnating fibers with a molten polysilazane in a fist step, converting the polysilazane in the fibers into the infusible state, in a second step, using $NH_3$, hexamethylenetetramine, an amine or a chlorosilane of the general formula $(CH_3)_nSiCl_m$, in which $n+m=4$ and $n=1, 2,$ or $3$, and, in a third step, heating the impregnated fibers to 800° C. to 2000° C. in an atmosphere of nitrogen, noble gas or ammonia. In this context the term "fibers" is to be understood to mean both one-dimensional structures and also two-dimensional structures of all types formed therefrom. Suitable molten polysilazanes are:

a) compounds of the general formula (I)

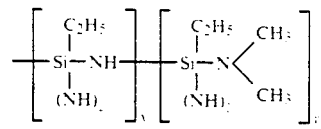

in which x and y denote the mole fractions of the two structural units and in which $x+y=1$ and $x=0.7-0.95$.

b) compounds of the general formula (II)

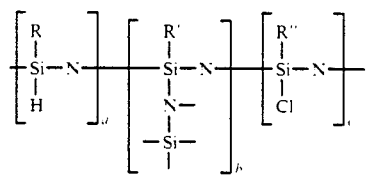

in which the free valencies of the nitrogen atoms are saturated with H atoms or silyl radicals

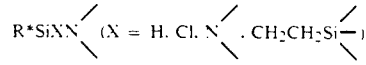

and in which R, R', and R" and R* are alkyl or alkenyl groups having up to 6 carbon atoms, preferably up to 3 carbon atoms, and a, b, and c denote the mole factions of the respective structural units. $R=R'=R''=R^*=CH_3$ is particular preferred.

The fibers used in the process according to the invention could be composed of, for instance, C, SiC, $Si_3N_4$, $Al_2O_3$ or carbon fiber-reinforced carbon. It is possible, for example, first to spin molten polysilazane into fibres, to convert them by heat treatment at 800° to 1600° C. into $Si_3N_4$ fibres, to produce a two-dimensional structure from the latter and then to impregnate said structure according to the invention with the same or a different polysilazane, to convert the polysilazane into the infusible state and to heat the product to 800° to 2000° C. If the polysilazane is to be rendered infusible by means of an amine, in general methylamine or ethylamine is used. However the preferred agent for converting to the infusible state is $NH_3$.

The combination of steps according to the invention can also be used on the same fibers several times in succession.

Furthermore, compounds of magnesium, aluminum, yttrium or of a rare earth metal, singly or as a mixture can be dissolved in the molten polysilazane as filler for the fibers and the fibers impregnated with this solution instead of with pure polysilazane; particularly suitable compounds are the nitrates, alcoholates, acetates or acetylacetonates, singly or as a mixture.

Of course, the impregnated fibers can also be shaped into a shaped article before the heat treatment.

A further subject of the invention is a ceramic/fiber composite, obtainable by means of the process just described, preferably carried out using compounds of the formula (I) or (II).

A further subject of the present invention is a ceramic/fiber composite, obtainable by means of the said process, in particular in its preferred embodiments, composed of fibers and a ceramic amorphous or partly crystalline matrix, in which the matrix contains 45–60% by weight Si, 30–40% by weight N, 0–25% by weight C and 0–20% by weight O and crystalline $Si_3N_4$ is present to the extent of more than 30% by weight.

In order to increase the corrosion resistance it can be advantageous if the finished and already mechanically processed ceramic/fiber composite is subjected to a further treatment with molten polysilazane, namely that it is coated with the latter, the coating is rendered infusible and the product then heated to 800° to 2000° C. in an atmosphere of nitrogen, noble gas or ammonia.

The preparation of the compounds of formula (I) which are suitable as starting materials is described in German Patent Application P 37 37 921.6. This application relates in general to the preparation of polymeric silazanes by reacting one or more dialkylaminoorganyldichlorosilanes of the formula $RSiCl_2$-NR'R', in which R=$C_1$-$C_4$-alkyl, vinyl or phenyl and R'=$C_1$-$C_4$-alkyl, with at least 3.35 moles of ammonia per mole of silane in a solvent at temperatures of −80° C. to +70° C.

The dimethylaminoethyldichlorosilane $C_2H_5SiCl_2$—$N(CH_3)_2$ (also referred to as "aminochlorosilane" in the following text) used as starting material for the polymeric silazanes of the formula (I) can be obtained according to S. S. Washburne, W. R. Peterson, J. Organometal. Chem. 21 (1970), page 59, by reacting ethyltrichlorosilane $C_2H_5SiCl_3$ with dimethylamine. The reaction is carried out in aprotic solvents, preferably polar, such as ethers, in particular in THF.

The molar ratio of ethyltrichlorosilane to dimethylamine can assume values between 1:1 and 1:3; a ratio of about 1:2 is preferred.

The ammonium salts formed during the reaction precipitate out of the reaction solution, whilst the aminochlorosilane formed remains in solution.

The resulting aminochlorosilane of the formula $C_2H_5SiCl_2$—$N(CH_3)_2$ is reacted, per mole, with at least 3.35 moles, preferably with at least 3.5 moles of ammonia in aprotic solvents, preferably polar, such as ethers, in particular THF. This is effected at temperatures between −80° C. and +70° C., preferably at −10° C. to 0° C.

The resulting polymeric silazane of the formula (I) is completely soluble in all common aprotic solvents.

In the formula (I) Si is never bonded to Si directly, but always via a NH bridge. If, for example, x=0.9 (and therefore y=0.1), then 10% of the originally available dimethylamino groups are still contained in the polymer and 90% of the silicon atoms are crosslinked three times via NH bridges. The controllable ratio of x to y determines the degree of crosslinking and thus the viscosity and the processability to ceramic.

In this way values of x=0.7–0.95 (y=0.3–0.05) are obtained if at least 3.35 moles of $NH_3$ are used per mole of aminochlorosilane. Preferably x=0.85–0.95 (y=0.15–0.05); this is then the case if at least 3.5 moles of $NH_3$ are used per mole of aminochlorosilane. In general at most 8 moles, preferably at most 6 moles of $NH_3$ are used per mole of aminochlorosilane. Naturally a larger relative quantity of $NH_3$ than 8 moles will also be successful, but this higher expense is unnecessary.

The preparation of compounds of the formula (II), which are also suitable as starting materials for the ceramic/fiber composites according to the invention, has already been described in part in the German Patent Application P 37 33 727.0; in this application the compounds are referred to as polymeric hydridochlorosilazanes. For their preparation oligohydridoalkylsilazanes of the general formula $(R^1SiHNH)_n$, in which n is about 3 to 12 and $R^1$ denotes an alkyl or alkenyl group having up to 6 carbon atoms, are reacted with a dichlorohydridoalkylsilane of the general formula $R^2SiHCl_2$, in which $R^2$ denotes an alkyl or alkenyl group having up to 6 carbon atoms, at 30° to 300° C. During this reaction highly volatile by-products are formed. These by-products are removed during the reaction.

The oligohydridoalkylsilazanes $(R^1SiHNH)_n$, with n equal to about 3 to about 12, used in this reaction can be obtained by reacting a dichlorohydridoalkylsilane of the formula $R^1SiHCl_2$, in which $R^1$ has the above meaning, with an excess of $NH_3$ in a solvent, as described in U.S. Pat. No. 4,482,669 (see there in particular columns 4, 5, 7 and 8). In general, a mixture of linear and cyclic oligomers of different chain lengths n forms in this process.

The radicals $R^1$ and $R^2$ in the oligohydridoalkylsilazanes $(R^1SiHNH)_n$ (also abbreviated to "oligosilazanes" in the following text) or in the dichlorohydridoalkylsilane $R^2SiHCl_2$ (also abbreviated to "dichloroalkylsilane" in the following text) can be identical or different; preferably they have up to 3 carbon atoms.

It is particularly preferred that $R^1=R^2=CH_3$. Preferably the molar ratio of the reactants in the above reaction dichloroalkylsilane: $R^1SiHNH$ unit of the oligosilazane is about 0.2:1 to 1.5:1, in particular 0.3:1 to 1:1.

For the reaction of the reactants with each other the oligosilazanes are preferably initially introduced and the dichloroalkylsilane added. Since the reaction is exothermic the temperature is preferably initially kept at 30° to 50° C. during the mixing together of the reactants. Subsequently the mixture is heated to temperatures of 100° to 300° C., preferably to 120° to 250° C.

The low-boiling products formed as by-products, such as $RSiHCl_2$, $RSiClH_2$, $RSiCl_3$, HCl, $H_2$, $NH_3$ (in which $R=R^1$ or $R^2$), partially escape during the reaction. On completion of the reaction the residual low-boiling products are in general removed from the reaction vessel by applying a vacuum.

The $NH_4Cl$ also formed during the reaction largely sublimes off from the reaction mixture in the course of the reaction. Any remaining residue of $NH_4Cl$ can be separated off from the prepared polymeric hydridochlorosilazane by extraction with an inert organic solvent, such as n-hexane, toluene or ether.

The reaction time depends on the speed of heating up and on the reaction temperature. In general a reaction time of 5 to 7 hours is sufficient.

It is also possible to carry out the reaction in an organic solvent. Suitable solvents are those which are inert towards the reactants and have a sufficiently high boiling point, such as, for example, saturated aliphatic or aromatic hydrocarbons, such as n-decane, Decalin, xylene or toluene, chlorinated hydrocarbons such as chlorobenzene, or ethers, such as dibenzyl ether or diethylene glycol diethyl ether. When a solvent is used in which the $NH_4Cl$ formed is insoluble, the latter can be separated off by filtration. The polymeric hydridochlorosilazanes are then obtained by distilling off the solvent under reduced pressure.

If appropriate, the process can also be carried out under reduced pressure. It is also possible to operate at pressures in the range of from 1 to 10 atmospheres. The process can also be designed to run continuously.

The polysilazanes of the formula (II) prepared in this manner have a net-like structure. The values of the mole fractions b and c are the higher (and correspondingly the value of a the lower), the larger the ratio of dichloroalkylsilane:R$^1$SiHNH unit of the oligosilazane. The particular values of a, b and c in each case can be determined by integration of the $^1$H-NMR spectra and by elementary analysis. In general the values of a, b and c are 0.1 to 0.8, where a+b+c=1. Preferred values for a and b are from 0.1 to 0.5, particularly from 0.2 to 0.4. The preferred values for c are 0.1 to 0.6, particularly 0.3 to 0.6. As stated these values can be adjusted by means of the relative proportion of the dichloroalkylsilane in the reaction mixture and monitored by means of the methods of analysis mentioned.

Surprisingly, it has been found that in the production of a ceramic/fiber composite according to the invention a single impregnation with molten polysilazane, followed by conversion to the infusible state and heating (three-step sequence) frequently already results in a completely satisfactory breaking strength of the ceramic/fiber composite. However, with repeated three-step sequences carried out in succession sometimes a further increase in the breaking strength and corrosion resistance of the ceramic/fiber composite can be achieved.

The process according to the invention is equally applicable to one-dimensional structures and two-dimensional structures built up from these, that is to say materials such as wovens, non-wovens, fleeces, filaments, threads, fibers, cords or networks. As stated, the term fibers shall be used to represent all of these structures. The fibers can be dipped in molten polysilazane, or the molten polysilazane is applied dropwise to the fibers or poured onto them. It can be advantageous to form thicker shaped articles from individual impregnated, relatively thin material layers by multistacking of one layer above another and processing these thicker shaped articles further after conversion of the polysilazane into the infusible state; in other cases it can be better to stack the initially non-impregnated material layers one above another and to impregnate this stack as a whole with polysilazane.

If (following the conversion of the polysilazane to the infusible state) the heating of the impregnated fibers is carried out in a nitrogen or noble gas atmosphere at 800° to 1200° C., an amorphous silicon matrix is obtained, which is composed of approximately 40 to 50% by weight Si, 20 to 30% by weight N, 15 to 25% by weight C, remainder O and Cl.

If, on the other hand, the heating of the impregnated fibers is carried out in an atmosphere of ammonia or an inert gas containing ammonia at 800° to 1200° C., an amorphous silicon matrix is obtained which is composed of approximately 50 to 60% by weight Si, 30 to 40% by weight N, less than 5% by weight O, less than 1% by weight C and less than 1% by weight Cl.

A matrix which is partly crystalline and composed of $\alpha$Si$_3$N$_4$ is obtained on heating in N$_2$, noble gas or NH$_3$ to temperatures from 1200° C. to about 1600° C., particularly from 1400° C. to about 1600° C.

A matrix composed of $\beta$-Si$_3$N$_4$ is obtained on heating to temperatures of about 1600° to 2000° C. Above about 1800° C. heating must then be carried out under an elevated nitrogen pressure of about 10 to 50 bar, in order to prevent a decomposition of the Si$_3$N$_4$.

A further subject of the present invention is a process for coating mechanically processed ceramic/fiber composites, which comprises enveloping the mechanically processed ceramic/fiber composite with molten polysilazane in a first step, converting the polysilazane into the infusible state in a second step, using NH$_3$, hexamethylenetetramine, an amine or a chlorosilane of the general formula (CH$_3$)$_n$SiCl$_m$, in which n+m=4 and n=1, 2 or 3, and, in a third step, heating the enveloped ceramic/fiber composite in an atmosphere of N$_2$, noble gas or NH$_3$ to 800° to 2000° C. For this process compounds of the formulae (I) and (II) are again particularly suitable as polysilazanes.

Using this process it is possible to envelop ceramics which are not resistant to oxidation, such as, for example, carbon fibers, with an Si$_3$N$_4$ layer and thus to protect them against oxidation at high temperature or against corrosion. NH$_3$ is preferably used in order to convert the polysilazane to the infusible state in the process described above.

In the following examples the flexural strength of the ceramic/fiber composites was measured as 4-point bending strength according to USA Standard Mil.-STD 1942 using the Instron 1326 universal testing machine: 4-point support with 40 mm/20 mm distance between the supports and a constant increase in force of 500 N/s on test pieces measuring 3.5 mm·4.5 mm·45 mm.

The following examples illustrate the invention. The percentage figures are percentages by weight, unless indicated otherwise.

EXAMPLE 1

Polysilazane of the formula (I) with x=0.9 and y=0.1 and carbon fibers (®Sigrafil C from Sigri GmbH, Meitingen, West Germany; with 40,000 individual filaments each having a diameter of 7 μm) were introduced into a vessel. The vessel was brought under a nitrogen atmosphere and heated to 100° C. The sizing had been removed previously from the carbon fibers in an acetone bath. The impregnated carbon fibers were removed from the polysilazane melt and cooled to 25° C. 20 carbon fibers impregnated in this manner were stacked at right angles to each other to form a block and the block was compacted in a press at a temperature of 50° C. under a pressure of 50 bar. The shaped article obtained in this way was kept at room temperature for 2 hours in an atmosphere of CH$_3$SiCl$_3$ in order to convert the polysilazane to the infusible state. Subsequently the shaped article was heated in the course of a heating period of 15 hours to a temperature of 100° C. in an atmosphere of nitrogen, left at this temperature for 10 hours and then cooled. The measured bending strength of the ceramic/fiber composite obtained is given in the table following the examples.

EXAMPLE 2

A ceramic/fiber composite was produced as in Example 1. This was then subjected to two further three-step sequences (impregnation, conversion to the infusible state, heating) using the same polysilazane as in Example 1. The measured bending strength of the resultant ceramic/fiber composite is again given in the table.

EXAMPLE 3

Polysilazane of the formula (II) with R=R'=R"=CH$_3$ and Al$_2$O$_3$—SiO$_2$ fibers (85% Al$_2$O$_3$, 15% SiO$_2$) with 1000 individual filaments each having a diameter of 0.017 mm were heated to 180° C. in a vessel under an atmosphere of nitrogen and the fibers were then removed from the melt and cooled to 25° C. The impregnated fibers were stacked in a crosswise manner and the stack compressed to a shaped article in a press at 110° C. under 40 bar pressure. The impregnated material was held for 2 hours at room temperature under an atmosphere of ammonia in a pressure vessel and then heated in the course of 15 hours to a temperature of 1400° C. under an ammonia pressure of 10 bar, left for 10 hours at this temperature and then cooled. The matrix consisted to the extent of 44% by weight of $Si_3N_4$. The measured bending strength of the ceramic/fiber composite obtained is again given in the table.

EXAMPLE 4

SiC fibers with 500 individual filaments each having a diameter of 0.015 mm were drawn, under nitrogen as a blanketing gas, through a bath of molten polysilazane of the formula (I) with x=0.8 and y=0.2, to which of 5% by weight yttrium acetate had been added. The SiC fibers impregnated in this manner were stacked crosswise on top of each other, compressed at a temperature of 50° C. in a press under 40 bar pressure and held for 2 hours in an atmosphere of ammonia. The shaped article was heated in the course of 15 hours to 1700° C. under a nitrogen pressure of 5 bar, left for 10 hours at this temperature and then cooled.

The matrix consisted to the extent of 78% by weight of $\beta$-$Si_3N_4$. The measured bending strength of the ceramic/fiber composite obtained is again given in the table.

EXAMPLE 5

Polymeric hydridochlorosilazane of the formula (II) with R=R'=R''=$CH_3$ was introduced into a melt-spin apparatus under $N_2$ blanketing gas and heated to 140° C. and the melt forced through a spinning jet of 0.1 mm diameter using a piston. The spun fiber was stretched to a fiber thickness of 20 μm under its own weight. The resulting fibers were treated with $NH_3$ gas at room temperature and rendered infusible by this means and were then subjected to pyrolysis in a furnace under an atmosphere of $NH_3$. For this purpose the temperature was increased in the course of 7 hours from 25° C. to 1200° C., kept for 1 hour at 1200° C. and then in the course of 4 hours reduced to room temperature again. The resulting fiber was amorphous when tested by X-rays and apart from the main constituents Si and N also contained 0.1% by weight C, 0.6% by weight Cl and 2.0% by weight O. The ceramic yield of the pyrolysis was 64% by weight. The tensile strength of the fiber was 2 GPa.

The fibers prepared in this manner were drawn in cords, each of 500 individual filaments, under nitrogen blanketing gas through a bath of molten polysilazane of the formula (I) with x=0.8 and y=0.2. The fibers impregnated in this manner were stacked crosswise one on top of another and compressed to a shaped article at 50° C. under a pressure of 40 bar. The shaped article was held for 2 hours in an atmosphere of $NH_3$. The shaped article was heated in the course of 20 hours to 1200° C. under a nitrogen pressure of 1 bar, left for 10 hours at this temperature and then cooled. The measured bending strength is given in the table.

TABLE

| Example No. | Fiber type | Bending strength MPa |
|---|---|---|
| 1 | C | 110 |
| 2 | C | 262 |
| 3 | $Al_2O_3$—$SiO_2$ | 186 |
| 4 | SiC | 392 |

TABLE-continued

| Example No. | Fiber type | Bending strength MPa |
|---|---|---|
| 5 | $Si_3N_4$ | 463 |

We claim:

1. A process for the production of a ceramic/fiber composite, which comprises the steps of (a) impregnating fibers with a molten polysilazane wherein said molten polysilazine is represented by the general formula (I)

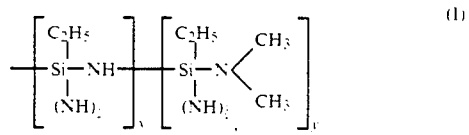

in which x and y represent the mole fractions of the two structural units and where x+y=1 and x=0.7 to 0.95; or by the general formula (II)

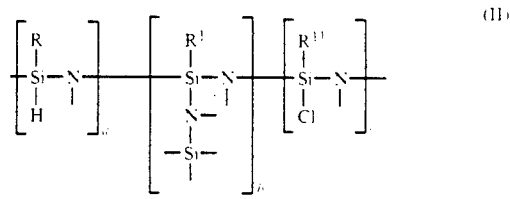

in which the free valencies of the nitrogen atoms are saturated with H atoms or silyl radicals

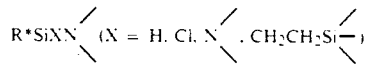

and in which R, R', R'' and R* denote alkyl or alkenyl groups having up to 6 carbon atoms; and a, b and c denote the mole fractions of the respective structural units; b) converting the polysilazine in the fibers into the infusible state using $NH_3$, hexamethylenetetramine, an amine or a chlorosilane of the general formula $(CH_3)_nSiCl_m$, in which n+m=4 and n=1,2 or 3, and c) heating the impregnated fibers to 800° to 2000° C. in an atmosphere selected from the group consisting of nitrogen, noble gas and ammonia.

2. The process as claimed in claim 1, wherein R, R', R'' and R* are alkyl or alkenyl groups having up to 3 carbon atoms.

3. The process as claimed in claim 1, wherein R=R'=R''=R*=$CH_3$.

4. The process as claimed in claim 1, wherein fibers of C, SiC, $Si_3N_4$ or $Al_2O_3$ or carbon fiber-reinforced carbon are used.

5. The process as claimed in claim 1, wherein a molten polysilazane is first spun into fibers, said fibers are then converted by heat treatment at 800° to 1600° C. into $Si_3N_4$ fibers, a two-dimensional structure is produced from the latter and said structure is then impregnated with the same or a different molten polysilazane, the polysilazane is converted to the infusible state and the product is heated to 800° to 2000° C.

6. The process as claimed in claim 1, wherein the sequence of the three process steps is carried out at least twice in succession on the same fibers.

7. The process as claimed in claim 1, wherein compounds of magnesium, aluminum, yttrium or of a rare earth metal, singly or as a mixture, are dissolved in the molten polysilazane as filler for the fibers and the fibers are impregnated with this solution instead of with pure polysilazane.

8. The process as claimed in claim 7, wherein the nitrates, alcoholates, acetates or acetylacetonates of the said metals are used, singly or as a mixture, as the filler.

9. A process for coating a ceramic/fiber composite, wherein a ceramic/fiber composite according to claim 1 is mechanically processed and is then coated through steps a, b, and c.

* * * * *